May 12, 1959     C. WHEATLEY     2,886,284
FLANGED SEALING RING
Filed Sept. 13, 1955

INVENTOR.
Charles Wheatley
BY
ATTORNEY

United States Patent Office 2,886,284
Patented May 12, 1959

2,886,284

FLANGED SEALING RING

Charles Wheatley, Tulsa, Okla.

Application September 13, 1955, Serial No. 534,131

1 Claim. (Cl. 251—358)

This invention relates to improvements in sealing rings, and more particularly, but not by way of limitation, to an improved self-sealing ring adapted for utilization with tilting disc gate valves.

Present day tilting disc type gate valves are normally provided with a gate member rotatably secured within a valve housing, and adapted to rotate therein to alternate positions of open and closed. The outer periphery of the gate member is usually provided with a circumferential recess or groove for receiving an O-ring or similar type sealing gasket for the purpose of sealing the gate against an inner peripheral portion or seat of the valve body when the gate is in a closed position. In actual usage, it has been found that these O-ring seals are frequently dislodged from the peripheral recess, particularly as the gate member is being rotated, wherein the sealing member is exposed to the full pressure existing within the valve. This loss of the sealing ring results in a leakage of fluid around the gate member, causing an inefficient valve. It will be apparent that this is a serious disadvantage in gate valve structures and not only results in an inefficient operation thereof, but also necessitates laborious and expensive repair operations.

The present invention contemplates a novel sealing gasket for utilization with a tilting disc gate valve, and which is so designed and constructed to substantially preclude accidental dislodging thereof from disposition on the gate member. The novel seal is provided with an inner metallic completely surrounded by a resilient covering adapted to engage an inner portion of the valve body to provide an efficient seal around the gate member to substantially preclude the flow of fluid through the valve in a closed position. The width of the metallic core is substantially greater than that of the opening through which the resilient covering extends into sealing engagement with the valve body, thus the pressure within the valve can in no manner sweep the sealing ring from its disposition within the gate member. It will be apparent that the novel sealing ring greatly increases the efficiency of the valve operation by providing an efficient seal therefor, and substantially reduces maintenance costs thereof by prolonging the effective life of the seal within the valve.

It is an important object of this invention to provide an improved sealing ring for a tilting disc type gate valve which is so designed and constructed as to substantially preclude accidental dislodging of the seal from the gate member during operation of the valve.

It is another object of this invention to provide a novel sealing ring having a metallic re-enforcement provided therein to substantially enhance the sealing qualities of the sealing ring.

It is still another object of this invention to provide a novel sealing ring for a tilting disc gate valve which substantially increases the efficiency of operation thereof and reduces the maintenance expense thereof.

It is still another object of this invention to provide an improved sealing ring which is of simple and economical construction.

Other objects and advantages of the invention will be evident from the following detailed description, read in conjunction with the accompanying drawings, which illustrate my invention.

Figure 1:
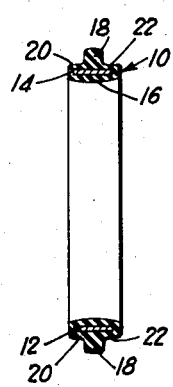
Figure 1 is a sectional view of a novel sealing ring embodying the invention.
Figure 2:
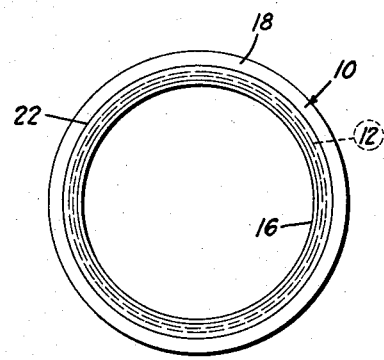
Figure 2 is a side elevational view of the novel sealing ring shown in Fig. 1 with portions thereof shown in dotted lines for purposes of better illustration.

Referring to the drawings in detail, reference character 10 refers in general to a sealing gasket generally of circular configuration, and comprising an annular metallic core 12 molded within a resilient covering 14, preferably made of neoprene or the like. The inner periphery 16 of the ring 10 is slightly arcuately shaped for a purpose as will hereinafter be set forth. A radially and outwardly extending circumferential flange or shoulder 18 is disposed around the outer periphery of the ring 10, thus providing oppositely disposed shoulders 20 and 22 adjacent the flange 18.

Figure 5:
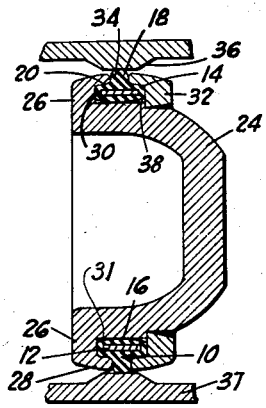
Figure 5 is a sectional view of the preferred embodiment of the invention disposed within a gate member of a valve.

Referring now to Fig. 5, a suitable cup shaped gate member 24, which may be provided within a tilting disc type gate valve assembly (not shown), is provided with an outwardly extending circumferentially disposed flange 26 having an inwardly directed shoulder 28 disposed therearound to provide a recess or groove 30 on the rear of the flange 26. The shoulder 20 of the seal ring 10 is adapted to seat within the groove 30 in such a manner that the arcuate inner periphery 16 is disposed adjacent an outer peripheral portion 31 of the gate member 24. A flanged ring member 32 is welded, or the like, to the gate member 24 and is spaced from the flange 26 and shoulder 28 to cooperate therewith for retaining the seal ring 10 in position, as clearly shown in Fig. 5. The radial flange 18 of the seal ring 10 extends through an opening 34 between the shoulder 28 and the flanged ring 32 and protrudes therebeyond to engage an inwardly extending shoulder 36 provided within the gate valve body, a portion 37 of which is shown, and adapted to provide a valve seat for the gate member 24. It will be apparent that the annular core 12 is of a width substantially larger than the opening 34 provided between the shoulder 28 and the flanged ring 32, thus precluding the possibility of the sealing ring 10 being dislodged by fluid pressure passing through the valve.

The arcuate configuration of the inner periphery 16 adjacent the gate member 24 provides an open area 38 conterminous with the outer edges thereof and the member 24. When the gate member is rotated to a closed position against the shoulder 36 of the valve body 37, as shown in Fig. 5, the flange 18 is brought into sealing engagement therewith and may be compressed radially inward against the gate 24. The areas 38 provide for compression of the resilient material 14 to preclude excessive extrusion of the seal ring 10 from the opening 34 and resulting distortion thereto. It will be apparent that pressure within the valve will distort the flange 18 slightly and wedge it tightly between the gate 24 and the shoulder 36 to effect an efficient seal, but the adequate compression of the seal 10 will prevent rupture and damage thereto.

Figure 3:
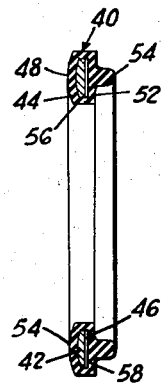
Figure 3 is a sectional view of a modified form of the sealing ring.
Figure 4:
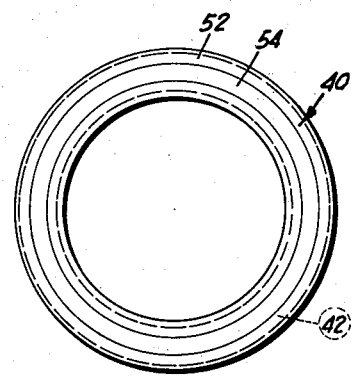
Figure 4 is a side elevational view of the modified sealing ring shown in Fig. 3 with portions thereof shown in dotted lines for purposes of better illustration.

Figure 3 depicts a modified sealing ring 40 comprising a metallic inner core 42 molded within a resilient covering 44. The core 42 is of substantially a washer shaped configuration with one side 46 thereof flat and the opposite side 48 slightly arcuately shaped so that the resilient material 44 molded therearound is provided with a similar arcuately shaped side 50. The opposite side 52 of the ring 40 is provided with an outwardly extending circular lip 54 disposed substantially media therearound. The core 42 is slightly less in thickness than is the internal passageway 56 provided within the resilient material 44 in order to provide an area 58 for compression of the resilient material 44 under high pressure conditions.

Figure 6:
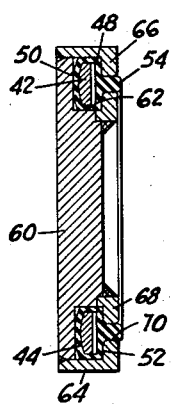
Figure 6 is a sectional view of the modified sealing ring disposed within a gate member of a valve.

Figure 6 depicts a typical installation arrangement of the sealing ring 40. A gate member 60 for a gate valve (not shown) is provided with a circular groove 62 around the entire circumference thereof to receive the ring 40. An annular ring 64 having an inwardly directed circumferential flange 66 is secured in any suitable manner, such as welding, to the outer periphery of the gate member 60 with the flange 66 adjacent the face 52 of the ring 40. A ring 68 is welded, or the like, to the gate member 60 and is diametrically spaced from the flange 66 to cooperate therewith in retaining the ring 40 within the groove 62 and to provide a circular opening or groove 70 adapted to receive the lip 54.

It will be noted that the lip 54 protrudes slightly beyond the ring 68 and the cooperating flange 66 in order to engage a portion of the valve body (not shown) when the gate member 60 is disposed in a closed position. When the gate member 60 is rotated in the usual manner (not shown) to a closed position, the extending portion of the flange 54 is brought into sealing contact with an inwardly directed flange or similar body portion (not shown) within the valve. As pressure within the valve acts upon the gate member 60 to force it into a closer engagement with the valve body portion, the resilient material 44 will readily compress within the groove 62 due to the cooperation of the compression area 58 and the curved face 50 as previously set forth to preclude extreme extrusion of the flange 54 from the opening 70. It will be apparent that the width of the core 42 is greater than the groove 70, thus substantially precluding the possibility of accidentally dislodging the ring 40 from the groove 62. Fluid pressure within the valve will thus be adequately sealed when the valve is in a closed position, and the inherent disadvantages of accidental loss of the seal therein will be substantially eliminated.

From the foregoing, it will be apparent that the present invention provides a novel sealing ring for utilization with a gate valve and which is so designed and constructed as to substantially preclude accidental dislodging thereof during operation of the valve. The stiffened core member will serve to retain the ring in proper disposition within the gate member of the valve and yet sufficient means are provided to assure compression of the seal under high pressure conditions to substantially preclude undue distortion and damage thereof in use. Thus, a more efficient gate valve is provided by substantially increasing the useful life of the sealing means therein, and thereby reducing the cost of maintenance thereof.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In combination with a valve having an annular retaining groove, an annular sealing ring disposed in said groove comprising a rigid annular core, a resilient covering disposed around the core, an outwardly extending flange provided on the outer periphery of the resilient covering, said groove having an opening of a width smaller than the width of the rigid core, said flange extending through the opening, said ring having an arcuate surface opposite the outwardly extending flange, said groove having a surface cooperating with the arcuate surface of said ring, said groove surface being so formed that it contacts only a portion of said arcuate surface whereby a clearance space for compression is provided between the remaining portion of said arcuate surface and the groove surface.

References Cited in the file of this patent

UNITED STATES PATENTS

| | | |
|---|---|---|
| 477,608 | Pratt | June 21, 1892 |
| 1,947,257 | Fritz | Feb. 13, 1934 |
| 2,349,170 | Jackman | May 16, 1944 |
| 2,401,377 | Smith | June 4, 1946 |
| 2,438,153 | Dick | Mar. 23, 1948 |
| 2,678,187 | Peters | May 11, 1954 |

FOREIGN PATENTS

| | | |
|---|---|---|
| 591,698 | Great Britain | of 1947 |